(No Model.) 4 Sheets—Sheet 4.

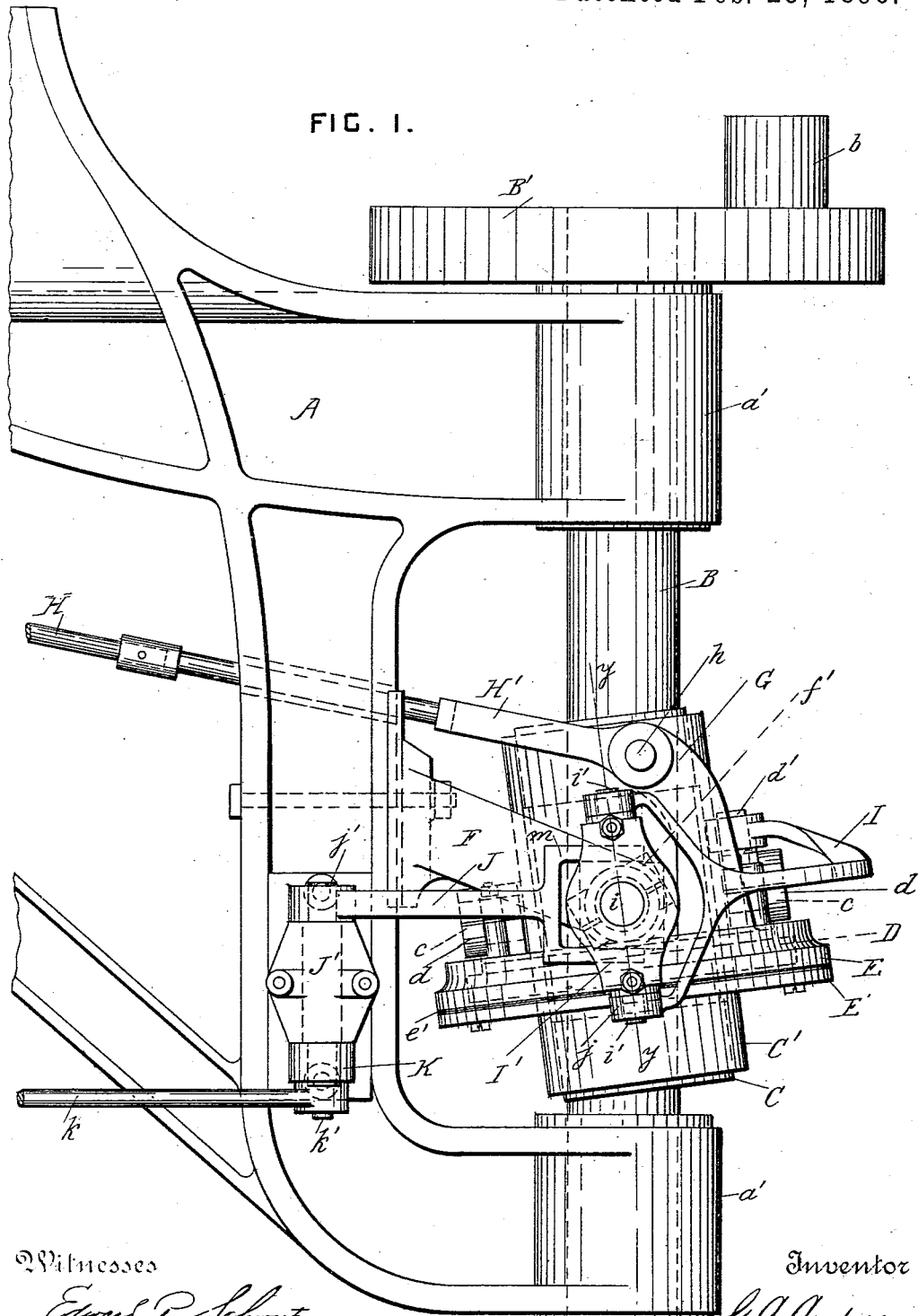

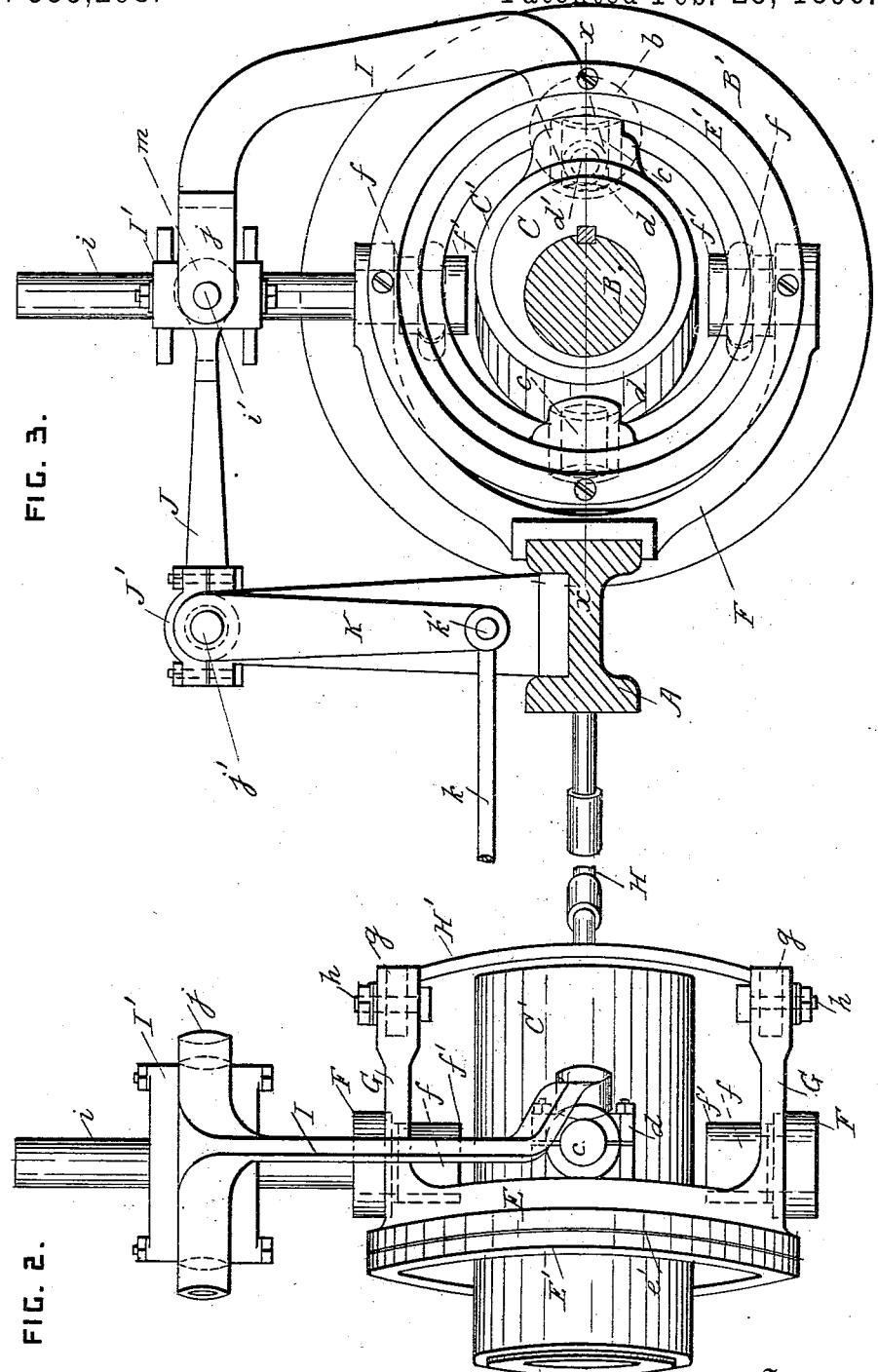

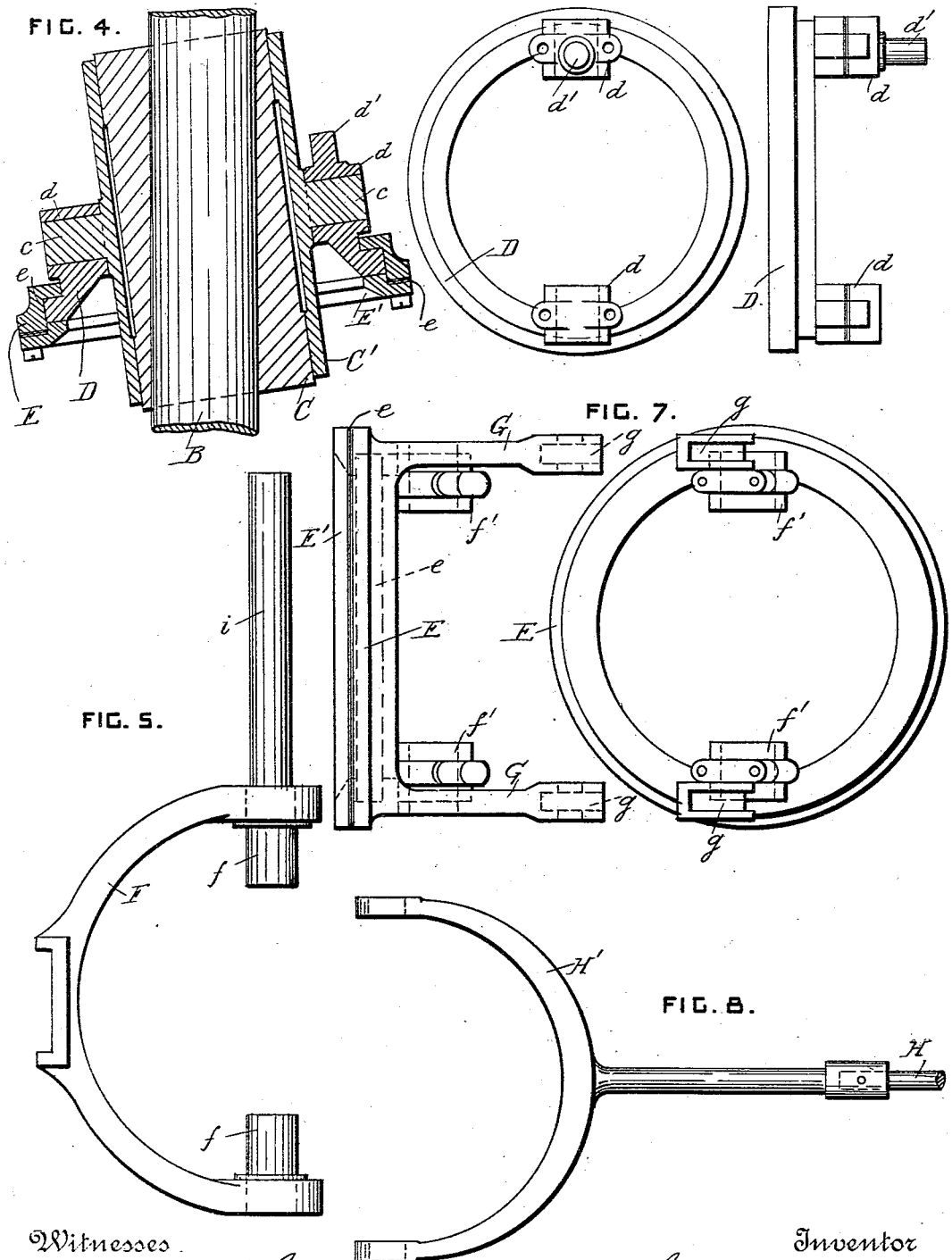

G. A. ANDERSON.
VALVE GEAR.

No. 555,298. Patented Feb. 25, 1896.

Witnesses
Edward P. Schwartz
George H. Ellis

Inventor
Gustaf A. Anderson
By Attorney Herbert W. Jenner

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

VALVE-GEAR.

SPECIFICATION forming part of Letters Patent No. 555,298, dated February 25, 1896.

Application filed October 16, 1895. Serial No. 565,829. (No model.)

*To all whom it may concern:*

Be it known that I, GUSTAF ARVID ANDERSON, a subject of the King of Sweden and Norway, residing at Waynesborough, in the county of Franklin and State of Pennsylvania, have invented certain new and useful Improvements in Valve-Gears; and I do hereby declare the following to be a full, clear, and exact description of the invention, such as will enable others skilled in the art to which it appertains to make and use the same.

This invention relates to gear for operating, varying the cut-off, and reversing the slide-valves of steam-engines; and it consists in the novel construction and combination of the parts hereinafter fully described and claimed.

Figure 9:
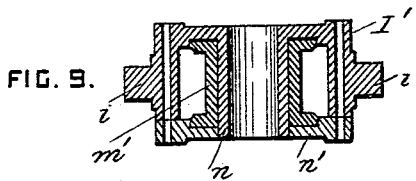
Figures 10, 11:
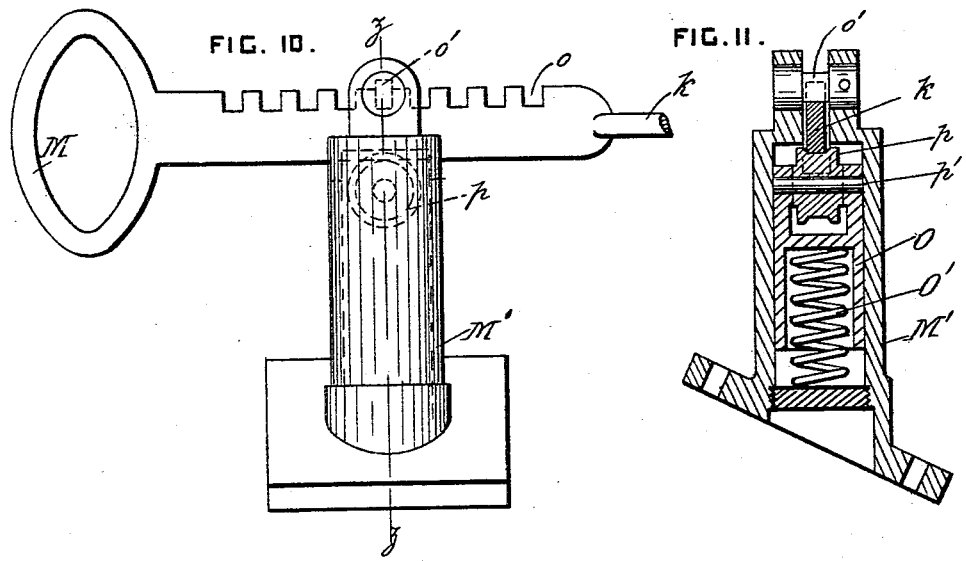
Figure 12:
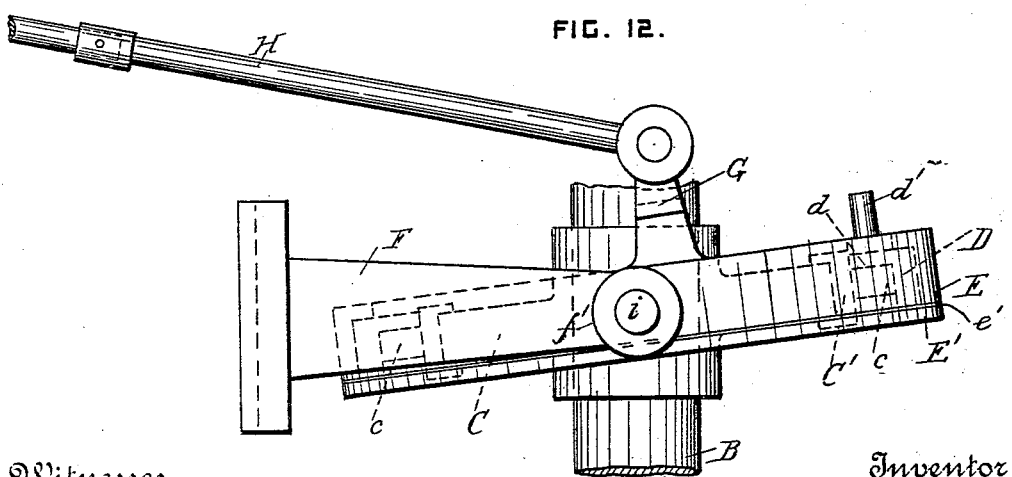

In the drawings, Figure 1 is a plan view of the valve-gear. Fig. 2 is an end view of the same. Fig. 3 is a side view showing a portion of the bed in section. Fig. 4 is a sectional plan view taken on the line $x\,x$ in Fig. 3. Fig. 5 is a detail side view of the bracket which pivotally connects the valve-gear with the bed. Fig. 6 is a detail front and side view of the reversing-ring. Fig. 7 is a detail front and side view of the bracket which operates the valve-rod. Fig. 8 is a detail side view of the fork on the end of the valve-rod. Fig. 9 is a vertical section of the reversing-block, taken on the line $y\,y$ in Fig. 1. Fig. 10 is a side view of the handle and catch of the reversing-rod. Fig. 11 is a vertical section through the catch-bracket, taken on the line $z\,z$ in Fig. 10. Fig. 12 is a plan view of a modification of the valve-gear.

A is a portion of the bed of a steam-engine of approved construction.

B is the engine crank-shaft, having a crank-plate B' and a crank-pin $b$ secured to it, and $a'$ are the bearings in which the said shaft is journaled.

C is a cylinder rigidly secured upon the shaft B and having its axis arranged obliquely at an acute angle to the axis of the shaft. This cylinder is hereinafter called an "oblique eccentric," from its oblique position and from having the function of an eccentric in operating the valve.

C' is the eccentric-strap, which encircles the eccentric C, and $c$ are pivots projecting laterally on opposite sides of the center of the strap C'.

D is a reversing-ring provided with two laterally-projecting bearings $d$, which engage with the pivots $c$, and $d'$ is a pin projecting laterally from one of the bearings $d$.

E is an annular bracket which encircles the ring D. This bracket is preferably provided with an annular cover E' bolted to one side of it, and $e'$ are removable liners interposed between the said cover and the main portion of the bracket. The ring D is free to oscillate in the groove $e$ of the bracket E, and the liners may be removed to compensate for the wear on the sides of the groove whenever necessary.

F is a forked bracket secured to the engine-bed or to any similar stationary support. This bracket F is provided with vertical pivot-pins $f$, which are arranged in the same plane as the pivots $c$.

The bracket E is provided with two bearings $f'$, which engage with the pivot-pins $f$, and G are two arms which project laterally from the bracket E and are provided with pockets $g$ at their free ends.

H is the valve-rod, which is provided with a forked end H' and pins $h$, which pivot the forked end to the ends of the arms G. The axis of the valve-rod is shown inclined to the axis of the engine-cylinder; but this is not an essential feature, and in this instance it is caused by the distance between the crank-pin and the forked end H' being considerable, the slide-valve being placed at an angle to the cylinder and as close to it as possible without any cranked connection in the valve-rod. The arms G may be connected with the valve in any other approved manner in carrying out this invention.

I is the reversing-arm, one end of which is pivoted on the pin $d'$, which projects from the reversing-ring D.

The valve-gear is shown placed in its midway position. Were the crank-shaft revolved with the valve-gear in this position, the revolution of the oblique eccentric would cause the ring D and the bracket E to oscillate in a horizontal plane, and the arms G would reciprocate the valve-rod to an extent not exceeding the amount of the lap and lead of the valve, so that the steam would not propel the piston in the cylinder. The stroke of the valve-rod is increased so that steam may be admitted to the cylinder to propel the piston by raising or lowering the arm I, and thereby bringing the pivots c nearer to the axis of the pivot-pins f. The direction of the motion of the crank-shaft is determined by the direction in which the arm I is moved. When the pin $d'$ is above the horizontal plane of the crank-shaft the crank-shaft revolves in one direction, and when the said pin is below the said plane the crank-shaft revolves in the opposite direction. The lead remains constant for all positions of the pin $d'$ and the cut-off is regulated by the distance of the pin $d'$ from the horizontal plane of the crank-shaft. When the pin $d'$ is nearest to either of the pins f the engine receives the most steam and the valve cuts off the latest. There is a position for the pin $d'$ very near each of the pins f, where the maximum supply of steam for forward and for backward motion is obtained. This position is prearranged in proportioning the valve-gear, and it is not desirable that the pin $d'$ should be moved past the position of maximum supply toward either of the pins f.

The reversing-arm I may be operated by any approved means, and by preference the mechanism hereinafter described is used for that purpose. The upper pin f has a vertical extension-pin i or a separate vertical pin may be secured to the bracket F, if desired.

I' is a block which is pivoted on the extension-pin i, and i' are pivots projecting from the sides of the block I' and engaging with the forked upper end j of the reversing-arm. The block I' and the reversing-arm oscillate upon the pin i as the oblique eccentric revolves, but this oscillation has no effect upon the valve-rod.

The engine is reversed by moving the block I' from one end of the pin i to the other.

J is the reversing-lever secured on one end of a shaft j', which is journaled in a bearing J' secured to the engine-bed. A vertical arm K is secured on the other end of the shaft j', and k is the reversing-rod pivoted to the lower end of the arm K by the pin k'.

The reversing-lever J has a forked end m, which engages with the flanges of a flat-sided spool m'. The spool m' is journaled on a sleeve n in the block I', and n' is a plate secured to the said block and holding the said spool in position. The reversing-rod k is provided with a handle M for operating it and a catch for holding it in position after it has been operated.

M' is a stationary catch-bracket secured to any convenient support, such as the boiler or the bed of the engine. The rod k is provided with notches o, and o' is a catch carried by the said bracket M'. The bracket M' is hollow, and O is a piston slidable in the said bracket and pressed upward by the spring O'.

A roller p is journaled on a pin p' at the upper part of the piston O, and this roller supports the free end of the rod k and holds it in engagement with the said catch.

In the modification shown in Fig. 12 the oblique eccentric is made narrow and becomes a disk instead of a cylinder. The remaining parts are proportioned to conform to the change in the form of the eccentric, but their action is not changed in any way.

What I claim is—

1. In a valve-gear, the combination, with an oblique eccentric, and its strap; of a reversing-ring pivoted to the said strap, a pivoted annular bracket encircling the said ring and provided with a laterally-projecting arm for operating the valve-rod, and means for changing the position of the reversing-ring in the said bracket, substantially as set forth.

2. In a valve-gear, the combination, with an oblique eccentric, and its strap provided with pivots; of a reversing-ring provided with laterally-projecting bearings journaled on the said pivots, an annular bracket pivoted in the same plane as the said ring, encircling it and provided with a laterally-projecting arm for operating the valve-rod, and means for changing the position of the reversing-ring in the said bracket, substantially as set forth.

3. In a valve-gear, the combination, with an oblique eccentric, and its strap; of an oscillatory guide-bracket provided with a laterally-projecting arm for operating the valve-rod, a reversing device—such as a ring—engaging with the said guide-bracket and pivoted to the said strap, and means for moving the said reversing device circumferentially in the said guide-bracket, substantially as set forth.

4. In a valve-gear, the combination, with an oblique eccentric, and its strap; of a reversing-ring pivoted to the said strap, a pivoted annular bracket encircling the said ring and provided with laterally-projecting arms, a valve-rod provided with a forked end pivoted to the said arms, and means for changing the position of the reversing-ring in the said bracket, substantially as set forth.

5. In a valve-gear, the combination, with an oblique eccentric, and its strap; of a reversing-ring pivoted to the said strap, a pivoted annular bracket provided with a laterally-projecting arm for operating the valve-rod, an annular cover secured to the said bracket and confining the said ring in a groove formed between it and the said bracket, and means for moving the reversing-ring circumferentially in the said groove, substantially as set forth.

6. In a valve-gear, the combination, with an oblique eccentric, and its strap; of a reversing-ring pivoted to the said strap, a pivoted annular bracket provided with a laterally-projecting arm for operating the valve-rod, a pin arranged on the axis of the said bracket, a reversing-block slidable on the said pin, and an arm pivoted to the said block and to the reversing-ring, substantially as set forth.

7. In a valve-gear, the combination, with a pivot-pin, a reversing-block slidable thereon, and an arm pivoted to the said block and operating to control the motion of the valve; of a reversing-lever provided with a forked end engaging with the said block, and a handle operatively connected with the said lever, substantially as set forth.

8. In a valve-gear, the combination, with a pivot-pin, a reversing-block slidable thereon, and an arm pivoted to the said block and operating to control the motion of the valve; of a flanged spool journaled in the said block concentric with its pivot, a plate secured to the said block and holding the said spool endwise in position, and a pivoted reversing-lever provided with a forked end engaging with the flanges on the said spool, substantially as set forth.

In testimony whereof I affix my signature in presence of two witnesses.

GUSTAF ARVID ANDERSON.

Witnesses:
   JNO. E. COOLEY,
   D. E. SASSEEN.